United States Patent
Yabuki et al.

(10) Patent No.: US 7,186,292 B2
(45) Date of Patent: *Mar. 6, 2007

(54) INKJET INK, INKJET RECORDING METHOD AND COLOR TONER COMPOSITION

(75) Inventors: Yoshiharu Yabuki, Kanagawa (JP); Tomohiro Chino, Kanagawa (JP); Toshiki Fujiwara, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 69 days.

This patent is subject to a terminal disclaimer.

(21) Appl. No.: 10/751,904

(22) Filed: Jan. 7, 2004

(65) Prior Publication Data
US 2005/0074684 A1 Apr. 7, 2005

(30) Foreign Application Priority Data
Jan. 8, 2003 (JP) .......................... P.2003-002330

(51) Int. Cl.
C09D 11/02 (2006.01)
G03G 9/08 (2006.01)

(52) U.S. Cl. ................ 106/31.48; 106/31.5; 106/31.52; 430/108.23

(58) Field of Classification Search ............. 106/31.52, 106/31.48, 31.5; 430/108.23; 534/756, 534/757, 761, 816, 831
See application file for complete search history.

(56) References Cited

U.S. PATENT DOCUMENTS

| 2004/0053988 | A1* | 3/2004 | Taguchi et al. ............. 514/419 |
| 2004/0094064 | A1* | 5/2004 | Taguchi et al. ............. 106/31.3 |
| 2004/0129172 | A1* | 7/2004 | Harada et al. ............ 106/31.46 |
| 2004/0154496 | A1* | 8/2004 | Taguchi .................... 106/31.48 |
| 2005/0083391 | A1* | 4/2005 | Fujiwara ..................... 347/105 |
| 2005/0139123 | A1* | 6/2005 | Fujiwara ................. 106/31.48 |

FOREIGN PATENT DOCUMENTS

| DE | 27 43 097 C2 | | 4/1979 |
| EP | 0492911 | * | 7/1992 |
| EP | 0 761 771 B1 | | 11/1998 |
| EP | 1388579 A2 | | 2/2004 |
| JP | 59-133259 | | 7/1984 |
| JP | 8-123085 | | 5/1996 |
| WO | WO 01/19925 A1 | | 3/2001 |
| WO | WO 02/083662 A2 | | 10/2002 |
| WO | WO 03/087238 A1 | | 10/2003 |

OTHER PUBLICATIONS

EPO Search Report dated Mar. 22, 2004 in EP Application No. 04000077.0-2102.

* cited by examiner

Primary Examiner—Helene Klemanski
(74) Attorney, Agent, or Firm—Buchanan Ingersoll & Rooney PC

(57) ABSTRACT

A coloring composition such as printing ink for inkjet printing or the like or electrophotographic color toner is provided, which can give a colored image or material excellent in the color hue and fastness, and also provide an inkjet recording method capable of forming an image having good color hue and high fastness to light and active gases in the environment, particularly ozone gas, and which is an inkjet ink comprising an azo dye having a specific structure containing an alkyl chain having 4 to more carbon atoms and not containing an ionic hydrophilic group; an inkjet recording method using the ink; and a color toner composition comprising the above-described azo dye.

11 Claims, No Drawings

INKJET INK, INKJET RECORDING METHOD AND COLOR TONER COMPOSITION

FIELD OF THE INVENTION

The present invention relates to an azo dye-containing inkjet ink, an inkjet recording method and color toner composition.

BACKGROUND OF THE INVENTION

In recent years, materials particularly for forming a color image are predominating as the image recording material. More specifically, a recording material using an inkjet system, a recording material using an electro-photographic system, a silver halide light-sensitive material using a transfer system, a printing ink, a recording pen and the like are popularly used.

In these color image recording materials, three primary color dyes (dyes or pigments) by a so-called additive or subtractive color mixing method are used for reproducing or recording a full color image, however, a dye having absorption properties capable of realizing a preferred color reproduction region and having fastness capable of enduring various use conditions is not found at present and improvements are keenly demanded.

The inkjet recording method is abruptly overspread and still making a progress, because the material cost is low, high-speed recording can be performed, noises are less generated at the recording and color recording is facilitated.

The inkjet recording method includes a continuous system of continuously jetting out a liquid droplet and an on-demand system of jetting out a liquid droplet according to image information signals, and the ejection system therefor includes a system of ejecting a liquid droplet by applying a pressure using a piezoelectric element, a system of ejecting a liquid droplet by generating a bubble in the ink using heat, a system of using an ultrasonic wave, and a system of ejecting a liquid droplet by suction using an electrostatic force. With respect to the inkjet recording ink, an aqueous ink, an oily ink or a solid (fusion-type) ink is used.

The dye used in such an inkjet recording ink is required to exhibit good solubility or dispersibility in a solvent, enable high-density recording, provide good color, be fast to light, heat and active gases in the environment (for example, oxidative gases (e.g., NOx, ozone) and SOx) and highly resistant against water and chemicals, ensure good fixing and less blurring on an image-receiving material, give an ink having excellent storability, have high purity and no toxicity and be available at a low cost. However, it is very difficult to find out a dye satisfying these requirements in a high level. In particular, a dye having good black color hue and being fast to light, humidity and heat, especially at the printing on an image-receiving material having an ink-accepting layer containing a porous inorganic white pigment particle, being fast to oxidative gases in the environment, such as ozone, is strongly demanded.

In color copiers and color laser printers utilizing an electrophotographic system, a toner generally obtained by dispersing a coloring material in a resin particle is widely used. The performance required of the color toner includes absorption property capable of realizing a preferred color reproduction region, particularly high transmittance (transparency) which is required upon use with an over head projector (hereinafter referred to as "OHP"), and various fastnesses in the environmental condition on use. The toner is generally obtained by dispersing a pigment as the coloring material in a particle. The toner using a pigment exhibits excellent fastness, however, the color reproducibility is inferior to that of a toner using a dye and since the toner is insoluble, aggregation readily occurs to give rise to reduction in the transparency or change in the color hue of transmitted color. On the other hand, a toner using a dye as the coloring material is disclosed in JP-A-8-123085 (the term "JP-A" as used herein means an "unexamined published Japanese patent application"). The toner using a dye disclosed in these patent publications is high in the transparency and free from change in the color hue but generally has a problem in the light fastness.

The dyes used for various uses described above are commonly required to have the following properties. That is, the dye has, for example, absorption characteristics preferred in view of color reproduction, has good fastness in the environmental condition on use, for example, light fastness, heat resistance, humidity resistance, resistance against oxidative gases such as ozone, and resistance against chemicals such as sulfurous acid gas, and has a large molar absorption coefficient.

Heretofore, disazo dyes and trisazo dyes have been generally used as the black dye. For the raw material of these disazo and trisazo dyes, non-heterocyclic compounds such as phenol, naphthol, naphthylamine and aniline are being widely used. As for the disazo dye obtained from such raw materials, the dyes disclosed, for example, in European Patent No. 0761771 are known, however, these dyes all are poor in the light fastness and furthermore, the fastness to oxidative gases such as ozone is extremely insufficient.

After studies to develop a coloring agent fast to oxidative gases such as ozone, the present inventors have reached a thinking of using mainly a heterocyclic compound as the raw material by departing from use of conventional raw materials such as phenol, naphthol, naphthylamine and aniline. A water-insoluble disazo or trisazo dye containing two or more heterocyclic rings is described, for example, in German Patent No. 2743097 and JP-A-59-133259. However, the dyes described all are a so-called disperse dye or reactive dye and developed for the dyeing of fiber. These patent publications are absolutely silent on the performances required in the present invention, that is, whether or not the dye has absorption characteristics preferred in view of color reproduction and the dye has fastness in the environmental condition on use (for example, light fastness, heat resistance, humidity resistance, resistance against oxidative gases such as ozone, which is particularly required in the inkjet image formation, and resistance against chemicals such as sulfurous acid gas) Moreover, it is completely unknown what structure is optimal for the image formation of the present invention.

SUMMARY OF THE INVENTION

The present invention has been made to solve those problems in conventional techniques and achieve the following objects.

That is, the objects of the present invention are:

(1) to provide various coloring compositions of giving a colored image or material excellent in the color hue and fastness, such as ink for printing (e.g., ink-jet printing) and color toner for electrophotographic system, and (2) to provide an inkjet recording method where an image having good color hue and high fastness to light and active gases in the environment, particularly ozone gas, can be formed by using the above-described ink.

As a result of particular investigations on azo dye derivatives to obtain a dye ensuring good color hue, high fastness to light and ozone and high solubility, the present inventors have found that the objects of the present invention can be attained by using dyes represented by the following formulae (1) to (4).

That is, according to the present invention, an inkjet ink, an inkjet recording method and a color toner composition having the following constitutions are provided and thereby, the above-described objects of the present invention can be attained.

1. An inkjet ink comprising at least one azo dye represented by the following formula (1), containing at least one alkyl chain having 4 or more carbon atoms and not containing an ionic hydrophilic group:

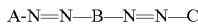

A—N=N—B—N=N—C     Formula (1)

wherein A, B and C each independently represents an aromatic group which may be substituted or a heterocyclic group which may be substituted, provided that A and C each is a monovalent group and B is a divalent group.

2. The inkjet ink according to the item 1, wherein the at least one azo dye is an azo dye represented by the following formula (2), containing at least one alkyl chain having 4 or more carbon atoms and not containing an ionic hydrophilic group:

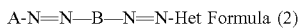

A—N=N—B—N=N-Het     Formula (2)

wherein A and B are the same as A and B in the formula (1), respectively, and Het represents an aromatic heterocyclic group.

3. The inkjet ink according to the item 1 or 2, wherein at least one of A and B in the formula (2) is an aromatic heterocyclic group.

4. The inkjet ink according to the item 2, wherein Het in the formula (2) is an aromatic nitrogen-containing six-membered heterocyclic group.

5. The inkjet ink according to the item 1, wherein the at least one azo dye is an azo dye represented by the following formula (3), containing at least one alkyl chain having 4 or more carbon atoms and not containing an ionic hydrophilic group:

Formula (3):

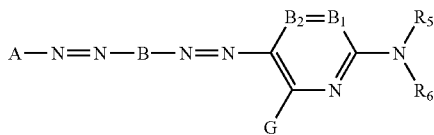

wherein A and B are the same as A and B in the formula (1), respectively, $B_1$ and $B_2$ each represents =$CR_1$— or —$CR_2$=, or either one of $B_1$ and $B_2$ represents a nitrogen atom and the other represents =$CR_1$— or —$CR_2$=, G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group or a sulfamoyl group, and each group may be further substituted, $R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent, provided that $R_5$ and $R_6$ are not a hydrogen atom at the same time, and $R_1$ and $R_5$, or $R_5$ and $R_6$ may combine to form a 5- or 6-membered ring.

6. The inkjet ink according to the item 5, wherein the at least one azo dye is an azo dye represented by the following formula (4), containing at least one alkyl chain having 4 or more carbon atoms and not containing an ionic hydrophilic group:

Formula (4):

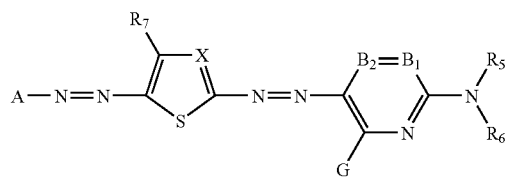

wherein X represents a nitrogen atom or —$C(R_8)$=; $R_7$ and $R_8$ each has the same meaning as $R_1$ in formula (3); A, $R_5$, $R_6$, $B_1$, $B_2$ and G are the same as A, $R_5$, $R_6$, $B_1$, $B_2$ and G in the formula (3), respectively.

7. The inkjet ink according to the item 6, wherein the at least one azo dye is an azo dye represented by the following formula (6), containing at least one alkyl chain having 4 or more carbon atoms and not containing an ionic hydrophilic group:

Formula (6):

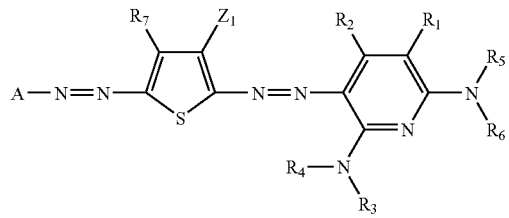

wherein $Z_1$ represents an electron-withdrawing group having a Hammett's substituent constant σp value of 0.20 or more; $R_1$, $R_2$, $R_5$ and $R_6$ have the same meanings as in the formula (3), respectively; $R_3$ and $R_4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group; A and $R_7$ have the same meanings as in the formula (4), respectively.

8. The inkjet ink according to any one of the items 1 to 7, wherein the total carbon atom number of all alkyl chains having 4 or more carbon atoms in the at least one azo dye is 12 or more.

9. An inkjet recording method comprising forming an image on an image-receiving material by using the ink-jet ink described in any one of the items 1 to 8, in which said image-receiving material comprises a support and an ink-accepting layer containing an inorganic white pigment particle.

10. A color toner composition comprising at least one azo dye described in any one of the items 1 to 8.

DETAILED DESCRIPTION OF THE INVENTION

The present invention is described in detail below.

<Azo Dye>

The azo dyes for use in the present invention represented by formula (1) and its subordinate concept formulae (2), (3) and (4) are described in detail below.

The groups and substituents constituting these formulae are described below.

The halogen atom includes a fluorine atom, a chlorine atom and a bromine atom.

In the present invention, the aliphatic group means an alkyl group, a substituted alkyl group, an alkenyl group, a substituted alkenyl group, an alkynyl group, a substituted alkynyl group, an aralkyl group and a substituted aralkyl group. The aliphatic group may be branched or may form a ring. The number of carbon atoms in the aliphatic group is preferably from 1 to 20, more preferably from 1 to 16. The aryl moiety in the aralkyl group and the substituted aralkyl group is preferably phenyl or naphthyl, more preferably phenyl. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-hydroxypropyl group, a cyclohexyl group, a benzyl group, a 2-phenethyl group, a vinyl group and an allyl group.

In the present invention, the monovalent aromatic group means an aryl group and a substituted aryl group. The aryl group is preferably a phenyl group or a naphthyl group, more preferably a phenyl group. The number of carbon atoms in the monovalent aromatic group is preferably from 6 to 20, more preferably from 6 to 16. Examples of the monovalent aromatic group include a phenyl group, a p-tolyl group, a p-methoxyphenyl group, an o-chlorophenyl group and an m-pivaloylaminophenyl group. The divalent aromatic group is a divalent form of these monovalent aromatic groups and examples thereof include a phenylene group, a p-tolylene group, a p-methoxyphenylene group, an o-chlorophenylene group and a naphthylene group.

The heterocyclic group includes a heterocyclic group having a substituent and an unsubstituted heterocyclic group. The heterocyclic ring may be condensed with an aliphatic ring, an aromatic ring or another heterocyclic ring. The heterocyclic group is preferably a 5- or 6-membered heterocyclic group. Examples of the heteroatom in the heterocyclic ring include N, O and S. Examples of the substituent include an aliphatic group, a halogen atom, an alkylsulfonyl group, an arylsulfonyl group, an acyl group, an acylamino group, a sulfamoyl group and a carbamoyl group. Examples of the heterocyclic group include a 2-pyridyl group, a 2-thienyl group, a 2-thiazolyl group, a 2-benzothiazolyl group, a 2-benzoxazolyl group and a 2-furyl group.

The carbamoyl group includes a carbamoyl group having a substituent and an unsubstituted carbamoyl group. Examples of the substituent include an alkyl group. Examples of the carbamoyl group include a methylcarbamoyl group and a dimethylcarbamoyl group.

The alkoxycarbonyl group includes an alkoxycarbonyl group having a substituent and an unsubstituted alkoxycarbonyl group. The alkoxycarbonyl group is preferably an alkoxycarbonyl group having from 2 to 20 carbon atoms. Examples of the substituent include an alkoxy group. Examples of the alkoxycarbonyl group include a methoxycarbonyl group and an ethoxycarbonyl group.

The aryloxycarbonyl group includes an aryloxycarbonyl group having a substituent and an unsubstituted aryloxycarbonyl group. The aryloxycarbonyl group is preferably an aryloxycarbonyl group having from 7 to 20 carbon atoms. Examples of the substituent include an alkoxy group. Examples of the aryloxycarbonyl group include a phenoxycarbonyl group.

The heterocyclic oxycarbonyl group includes a heterocyclic oxycarbonyl group having a substituent and an unsubstituted heterocyclic oxycarbonyl group. The heterocyclic oxycarbonyl group is preferably a heterocyclic oxycarbonyl group having from 2 to 20 carbon atoms. Examples of the substituent include an alkyl group. Examples of the heterocyclic oxycarbonyl group include a 2-pyridyloxycarbonyl group.

The acyl group includes an acyl group having a substituent and an unsubstituted acyl group. The acyl group is preferably an acyl group having from 1 to 20 carbon atoms. Examples of the substituent include an alkoxy group. Examples of the acyl group include an acetyl group and a benzoyl group.

The alkoxy group includes an alkoxy group having a substituent and an unsubstituted alkoxy group. The alkoxy group is preferably an alkoxy group having from 1 to 20 carbon atoms. Examples of the substituent include an alkoxy group and a hydroxyl group. Examples of the alkoxy group include a methoxy group, an ethoxy group, an isopropoxy group, a methoxyethoxy group and a hydroxyethoxy group.

The aryloxy group includes an aryloxy group having a substituent and an unsubstituted aryloxy group. The aryloxy group is preferably an aryloxy group having from 6 to 20 carbon atoms. Examples of the substituent include an alkoxy group and an alkyl group. Examples of the aryloxy group include a phenoxy group, a p-methoxyphenoxy group and an o-methoxyphenoxy group.

The heterocyclic oxy group includes a heterocyclic oxy group having a substituent and an unsubstituted heterocyclic oxy group. The heterocyclic oxy group is preferably a heterocyclic oxy group having from 2 to 20 carbon atoms. Examples of the substituent include an alkyl group and an alkoxy group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes an acyloxy group having a substituent and an unsubstituted acyloxy group. The acyloxy group is preferably an acyloxy group having from 1 to 20 carbon atoms. Examples of the substituent include an alkyl group. Examples of the acyloxy group include an acetoxy group and a benzoyloxy group.

The carbamoyloxy group includes a carbamoyloxy group having a substituent and an unsubstituted carbamoyloxy group. Examples of the substituent include an alkyl group. Examples of the carbamoyloxy group include an N-methylcarbamoyloxy group.

The alkoxycarbonyloxy group includes an alkoxycarbonyloxy group having a substituent and an unsubstituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes an aryloxycarbonyloxy group having a substituent and an unsubstituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes an amino group substituted by an alkyl group, an aryl group or a heterocyclic group, and the alkyl group, the aryl group and the heterocyclic group each may further have a substituent. The alkylamino group is preferably an alkylamino group having from 1 to 20 carbon atoms. Examples of the substituent include an alkoxy group. Examples of the alkylamino group include a methylamino group and a diethylamino group.

The arylamino group includes an arylamino group having a substituent, an unsubstituted arylamino group and an anilino group. The arylamino group is preferably an arylamino group having from 6 to 20 carbon atoms. Examples of the substituent include a halogen atom and an alkyl group. Examples of the arylamino group include a phenylamino group and a 2-chlorophenylamino group.

The heterocyclic amino group includes a heterocyclic amino group having a substituent and an unsubstituted heterocyclic amino group. The heterocyclic amino group is preferably a heterocyclic amino group having from 2 to 20 carbon atoms. Examples of the substituent include an alkyl group and a halogen atom.

The acylamino group includes an acylamino group having a substituent and an unsubstituted acylamino group. The acylamino group is preferably an acylamino group having from 2 to 20 carbon atoms. Examples of the substituent include an alkoxy group. Examples of the acylamino group include an acetylamino group, a propionylamino group, a benzoylamino group, an N-phenylacetylamino group and a 3,5-dichlorobenzoylamino group.

The ureido group includes a ureido group having a substituent and an unsubstituted ureido group. The ureido group is preferably a ureido group having from 1 to 20 carbon atoms. Examples of the substituent include an alkyl group and an aryl group. Examples of the ureido group include a 3-methylureido group, a 3,3-dimethylureido group and a 3-phenylureido group.

The sulfamoylamino group includes a sulfamoylamino group having a substituent and an unsubstituted sulfamoylamino group. Examples of the substituent include an alkyl group. Examples of the sulfamoylamino group include an N,N-dipropylsulfamoylamino group.

The alkoxycarbonylamino group includes an alkoxycarbonylamino group having a substituent and an unsubstituted alkoxycarbonylamino group. The alkoxycarbonylamino group is preferably an alkoxycarbonylamino group having from 2 to 20 carbon atoms. Examples of the substituent include a halogen atom. Examples of the alkoxycarbonylamino group include an ethoxycarbonylamino group.

The aryloxycarbonylamino group includes an aryloxycarbonylamino group having a substituent and an unsubstituted aryloxycarbonylamino group. The aryloxycarbonylamino group is preferably an aryloxycarbonylamino group having from 7 to 20 carbon atoms. Examples of the substituent include an alkyl group. Examples of the aryloxycarbonylamino group include a phenoxycarbonylamino group.

The alkylsulfonylamino group and the arylsulfonylamino group include an alkylsulfonylamino group having a substituent, an arylsulfonylamino group having a substituent, an unsubstituted alkylsulfonylamino group and an unsubstituted arylsulfonylamino group. The sulfonylamino group is preferably a sulfonylamino group having from 1 to 20 carbon atoms. Examples of the substituent include an alkoxy group. Examples of these sulfonylamino groups include a methylsufonylamino group, an N-phenylmethylsulfonylamino group, a phenylsulfonylamino group and a 4-methoxyphenylsulfonylamino group.

The heterocyclic sulfonylamino group includes a heterocyclic sulfonylamino group having a substituent and an unsubstituted heterocyclic sulfonylamino group. The heterocyclic sulfonylamino group is preferably a heterocyclic sulfonylamino group having from 1 to 12 carbon atoms. Examples of the substituent include an alkyl group. Examples of the heterocyclic sulfonylamino group include a 2-thiophenesulfonylamino group and a 3-pyridinesulfonylamino group.

The heterocyclic sulfonyl group includes a heterocyclic sulfonyl group having a substituent and an unsubstituted heterocyclic sulfonyl group. The heterocyclic sulfonyl group is preferably a heterocyclic sulfonyl group having from 1 to 20 carbon atoms. Examples of the substituent include an alkyl group. Examples of the heterocyclic sulfonyl group include a 2-thiophenesulfonyl group and a 3-pyridinesulfonyl group.

The heterocyclic sulfinyl group includes a heterocyclic sulfinyl group having a substituent and an unsubstituted heterocyclic sulfinyl group. The heterocyclic sulfinyl group is preferably a heterocyclic sulfinyl group having from 1 to 20 carbon atoms. Examples of the substituent include an alkyl group. Examples of the heterocyclic sulfinyl group include a 4-pyridinesulfinyl group.

The alkylthio group, the arylthio group and the heterocyclic thio group include an alkylthio group having a substituent, an arylthio group having a substituent, a heterocyclic thio group having a substituent, an unsubstituted alkylthio group, an unsubstituted arylthio group and an unsubstituted heterocyclic thio group. The alkylthio group, the arylthio group and the heterocyclic thio group are preferably an alkylthio group having from 1 to 20 carbon atoms, an arylthio group having from 1 to 20 carbon atoms and a heterocyclic thio group having from 1 to 20 carbon atoms. Examples of the substituent include an alkoxy group. Examples of the alkylthio group, arylthio group and heterocyclic thio group include a methylthio group, a phenylthio group and a 2-pyridylthio group.

The alkylsulfonyl group and the arylsulfonyl group include an alkylsulfonyl group having a substituent, an arylsulfonyl group having a substituent, an unsubstituted alkylsulfonyl group and an unsubstituted arylsulfonyl group. Examples of the alkylsulfonyl group and arylsulfonyl group include a methylsulfonyl group and a phenylsulfonyl group.

The alkylsulfinyl group and the arylsulfinyl group include an alkylsulfinyl group having a substituent, an arylsulfinyl group having a substituent, an unsubstituted alkylsulfinyl group and an unsubstituted arylsulfinyl group. Examples of the alkylsulfinyl group and arylsulfinyl group include a methylsulfinyl group and a phenylsulfinyl group.

The sulfamoyl group includes a sulfamoyl group having a substituent and an unsubstituted sulfamoyl group. Examples of the substituent include an alkyl group. Examples of the sulfamoyl group include a dimethylsulfamoyl group and a bis-(2-hydroxyethyl)sulfamoyl group.

Formulae (1), (2), (3) and (4) are described below.

In the following, those described above for each group or substituent also apply.

In formula (1), A, B and C each independently represents an aromatic group (A and C are a monovalent aromatic group such as aryl group, and B is a divalent aromatic group such as arylene group) which may be substituted, or a heterocyclic group (A and C are a monovalent heterocyclic group and B is a divalent heterocyclic group) which may be substituted. Examples of the aromatic ring include a benzene ring and a naphthalene ring. Examples of the heteroatom in the heterocyclic ring include N, O and S. Examples of the heterocyclic ring include a 5 to 7-membered heterocyclic ring. The aromatic and heterocyclic ring may be condensed with an aliphatic ring, an aromatic ring or another heterocyclic ring.

The substituent may be an arylazo group or a heterocyclic azo group. In this case, a trisazo dye, a tetrakisazo dye or the like is formed.

At least two of A, B and C are preferably a heterocyclic group.

The heterocyclic group represented by C is preferably an aromatic heterocyclic group, more preferably an aromatic nitrogen-containing 6-membered heterocyclic group, and still more preferably an aromatic nitrogen-containing 6-membered heterocyclic group represented by the following formula (5). When C is an aromatic nitrogen-containing 6-membered heterocyclic group represented by formula (5), formula (1) corresponds to formula (3).

Formula (5):

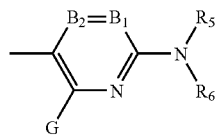

In formula (4), $B_1$ and $B_2$ each represents =$CR_1$— or —$CR_2$= or either one of $B_1$ and $B_2$ represents a nitrogen atom and the other represents =$CR_1$— or —$CR_2$=. $B_1$ and $B_2$ each is preferably =$CR_1$— or —$CR_2$=.

$R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent. The substituent represented by $R_5$ and $R_6$ is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group. Each group may further have a substituent. However, $R_5$ and $R_6$ are not a hydrogen atom at the same time.

G, $R_1$ and $R_2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group or a sulfamoyl group, and each group may be further substituted.

The substituent represented by G is preferably a hydrogen atom, a halogen atom, an aliphatic group, an aromatic group, a hydroxyl group, an alkoxy group, an aryloxy group, an acyloxy group, a heterocyclic oxy group, an amino group (including an arylamino group and a heterocyclic amino group), an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group (including an arylamino group and a heterocyclic amino group) or an acylamino group, and most preferably a hydrogen atom, an acylamino group or an acylamino group. Each group may further have a substituent.

The substituents represented by $R_1$ and $R_2$ each is preferably a hydrogen atom, an alkyl group, a halogen atom, an alkoxycarbonyl group, a carbamoyl group, a hydroxy group, an alkoxy group or a cyano group. Each group may further have a substituent.

$R_1$ and $R_5$, or $R_5$ and $R_6$ may combine to form a 5- or 6-membered ring.

When the substituents represented by $R_1$, $R_2$, $R_5$, $R_6$ and G each further has a substituent, examples of the substituent include the substituents described above for G, $R_1$ and $R_2$. Also, an alkyl chain having 4 or more carbon atoms is preferably further present as a substituent on any one position of $R_1$, $R_2$, $R_5$, $R_6$ and G.

A represents an aromatic group or a heterocyclic group and A is preferably an aryl group, a pyrazolyl group, an imidazolyl group, an isothiazolyl group, a thiadiazolyl group or a benzothiazolyl group, where each group may be further substituted. A is more preferably an aryl, pyrazolyl or isothiazolyl group containing an alkyl chain having 4 to more carbon atoms, and most preferably an aryl or pyrazolyl group containing an alkyl chain having 4 to more carbon atoms.

When B has a ring structure, preferred examples of the heterocyclic ring include a thiophene ring, a thiazole ring, an imidazole ring, a benzothiazole ring and a thienothiazole ring. Each heterocyclic group may further have a substituent. Among these heterocyclic rings, a thiophene ring, a thiazole ring, an imidazole ring, a benzothiazole ring and a thienothiazole ring represented by the following formulae (a) to (e) are more preferred. When B is a thiophene ring or a thiazole ring represented by formula (a) or (b) and C is a structure represented by formula (5), formula (1) corresponds to formula (4).

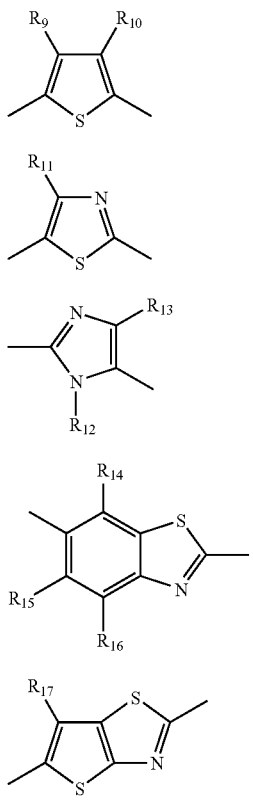

(a)

(b)

(c)

(d)

(e)

wherein $R_9$ to $R_{17}$ each represents a substituent having the same meaning as G, $R_1$ and $R_2$ in formula (3).

In the present invention, the structure represented by the following formula (6) is particularly preferred:

Formula (6):

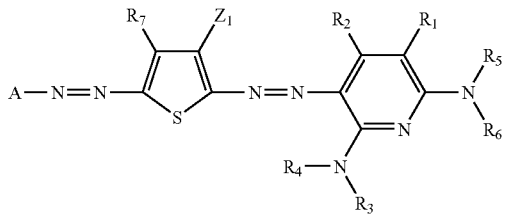

In formula (6), $Z_1$ represents an electron-withdrawing group having a Hammett's substituent constant σp value of 0.20 or more. $Z_1$ is preferably an electron-withdrawing group having a σp value of 0.30 or more, more preferably 0.45 or more, still more preferably 0.60 to more, but the σp value preferably does not exceed 1.0. Specific preferred examples of this substituent include electron-withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

$R_1$, $R_2$, $R_5$ and $R_6$ have the same meanings as in formula (3). $R_3$ and $R_4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, preferably a hydrogen atom, an aromatic group, a heterocyclic group, an acyl group, an alkylsulfonyl group or an arylsulfonyl group, more preferably a hydrogen atom, an aromatic group or a heterocyclic group. $R_7$ have the same meanings as in formula (4). A and $R_7$ preferably represents a hydrogen atom, an aliphatic group, an aromatic group or a heterocyclic group, and more preferably represents a hydrogen atom or an aromatic group.

The groups described in regard to formula (6) each may further have a substituent. When these groups each further has a substituent, examples of the substituent include the substituents described in regard to formula (3), and the groups described as examples for G, $R_1$ and $R_2$.

Here, the Hammett's substituent constant σp value used in the present invention is described. The Hammett's rule is an empirical rule advocated by L. P. Hamnett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), Lange's *Handbook of Chemistry*, 12th ed., McGraw-Hill (1979), and *Kagakuno Ryoiki* (*Chemistry Region*), special number, No. 122, pp. 96–103, Nankodo (1979). In the present invention, each substituent is limited or described using the Hammett's substituent constant $\sigma_p$ but this does not mean that the substituent is limited only to those having a known value which can be found in the above-described publications. Needless to say, the substituent includes substituents of which σp value is not known in publications but when measured based on the Hammett's rule, falls within the range specified. Furthermore, although formulae (1), (2), (3), (4) and (6) of the present invention include those which are not a benzene derivative, the σp value is used as a measure for showing the electron effect of the substituent irrespective of the substitution site. In the present invention, the σp value is used in this meaning.

Examples of the electron-withdrawing group having a Hammett's substituent constant σp value of 0.60 or more include a cyano group, a nitro group, an alkylsulfonyl group (e.g., methanesulfonyl) and an arylsulfonyl group (e.g., benzenesulfonyl).

Examples of the electron-withdrawing group having a Hammett's σp value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant σp value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a σp value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron-withdrawing group having a σp value of 0.20 or more include, in addition to those described above, a halogen atom.

In the azo dye represented by formula (4), the following combination of substituents is particularly preferred. $R_5$ and $R_6$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R_5$ and $R_6$ are not a hydrogen atom at the same time.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

$B_1$ and $B_2$ each is preferably $=CR_1-$ or $-CR_2=$, and $R_1$ and $R_2$ each is preferably a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group. X is preferably $-CR_8=$, and $R_8$ is preferably a cyano group, a carbamoyl group, an acyl group, an alkoxycarbonyl group, an alkylsulfonyl group or an arylsulfonyl group, more preferably a cyano group. $R_7$ is preferably a hydrogen atom, a heterocyclic group or an aromatic group, and more preferably a hydrogen atom or an aromatic group.

As for the preferred combination of substituents in the compound represented by formula (1), a compound where at least one of various substituents is the preferred group is preferred, a compound where a larger number of various substituents are the preferred groups is more preferred, and a compound where all substituents are the preferred groups is most preferred.

In the present invention, the dyes represented by formulae (1), (2), (3), (4) and (6) each contains at least one alkyl chain having 4 or more carbon atoms. More specifically, in formula (1), at least one of A, B and C contains at least one alkyl chain having 4 to more carbon atoms, preferably two or more alkyl chains having 4 or more carbon atoms, still more preferably alkyl chains having 6 or more carbon atoms. The dye is most preferably a dye where the total number of carbons in all alkyl chains having 4 or more carbon atoms is 12 or more. By containing at least one alkyl chain having 4 or more carbon atoms, the dye is enhanced in the oil solubility. The upper limit of the total number of carbons in all alkyl chains having 4 or more carbon atoms is about 60.

Also, the dyes represented by formulae (1), (2), (3), (4) and (6) each does not contain an ionic hydrophilic group within the molecule and is not water-soluble. The ionic hydrophilic group as used in the present invention means a substituent which is easily dissociated in water to form an ion and is present in the form of a substituent (e.g., sulfo, phosphono) or a salt. However, free substituents having pKa of 3 or more (e.g., carboxyl) do not come under the ionic hydrophilic group.

Specific examples of the azo dye represented by formula (1) are set forth below, however, the azo dye for use in the present invention is not limited to those set forth below.

TABLE 1

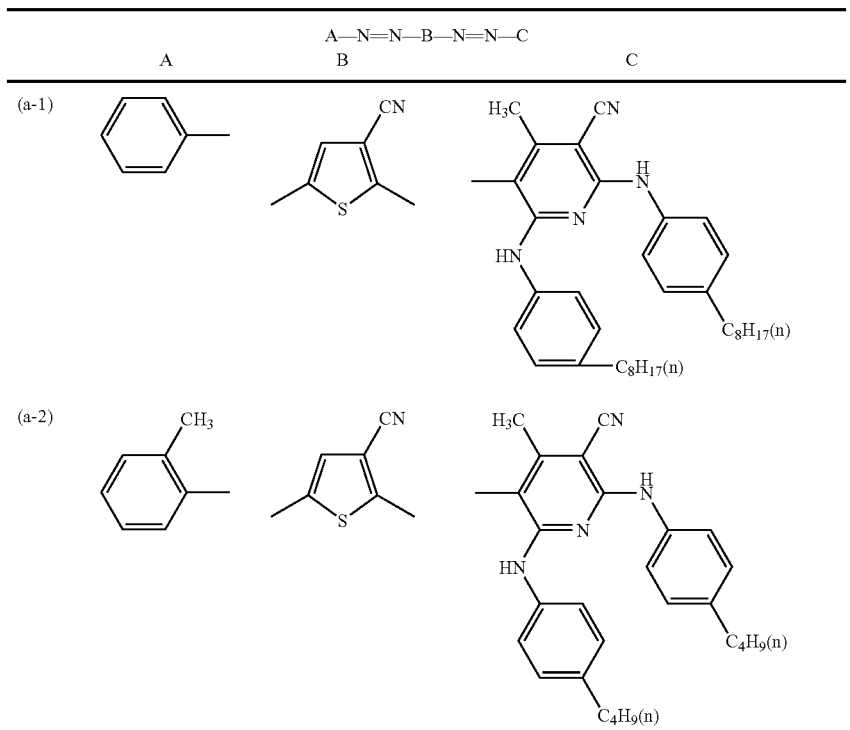

TABLE 1-continued
| | A—N=N—B—N=N—C | |
|---|---|---|
| A | B | C |
(a-3) 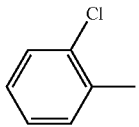 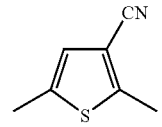 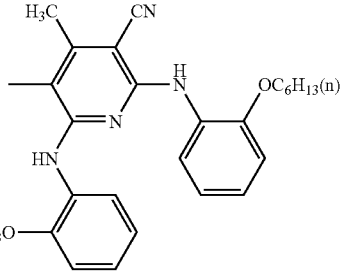
(a-4) 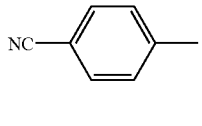 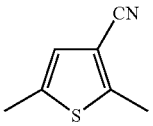 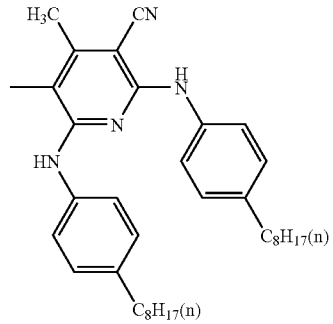
(a-5) 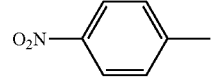 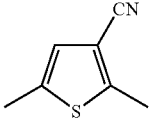 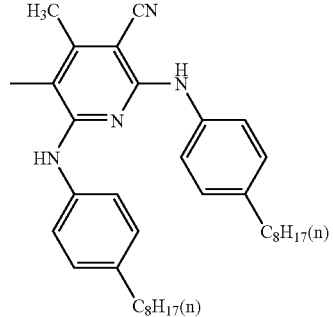
(a-6) 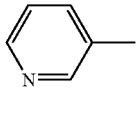 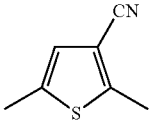 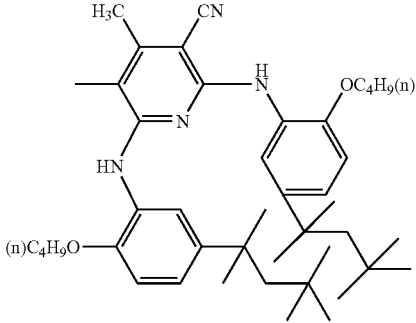

TABLE 2
| | A | A—N=N—B—N=N—C  B | C |
|---|---|---|---|
| (b-1) | 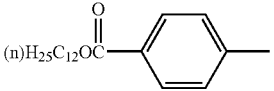 | 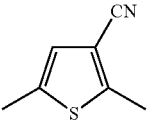 | 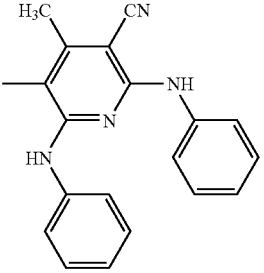 |
| (b-2) | 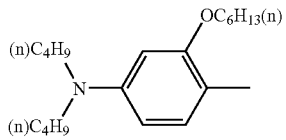 | 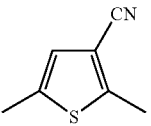 | 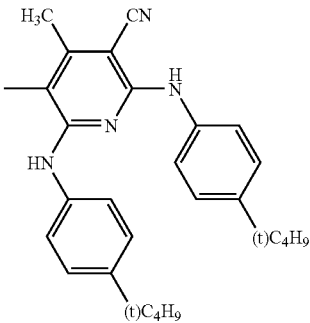 |
| (b-3) | 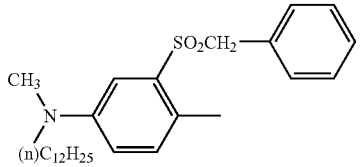 | 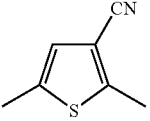 | 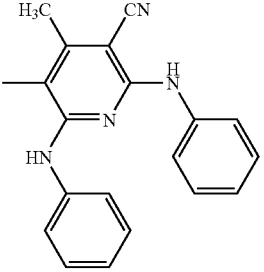 |
| (b-4) | 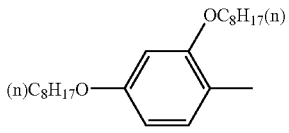 | 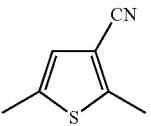 | 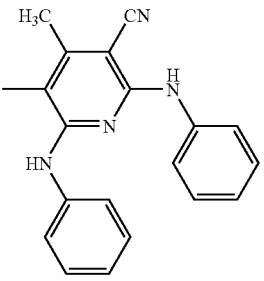 |
| (b-5) | 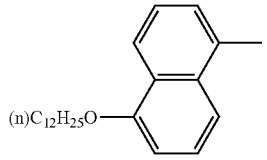 | 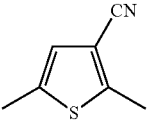 | 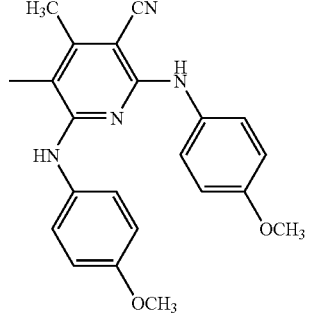 |

TABLE 2-continued
A—N=N—B—N=N—C
| | A | B | C |
|---|---|---|---|
| (b-6) | 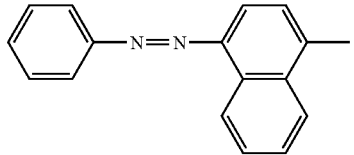 | 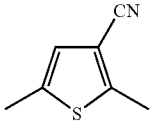 | 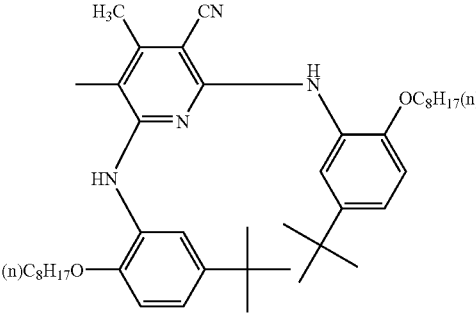 |
| (b-7) | 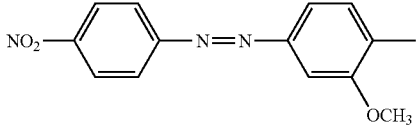 | 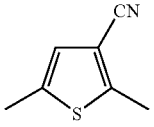 | 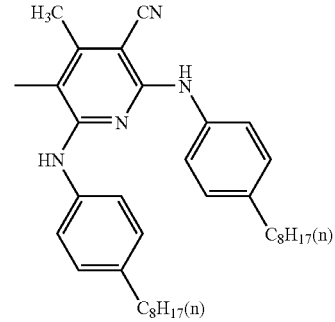 |
TABLE 3
A—N=N—B—N=N—C
| | A | B | C |
|---|---|---|---|
| (c-1) | 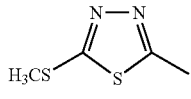 | 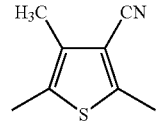 | 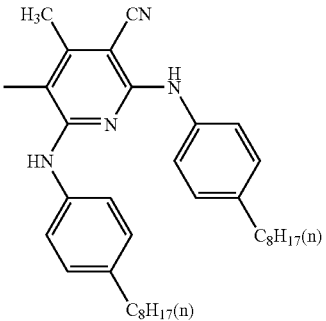 |
| (c-2) | 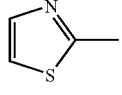 | 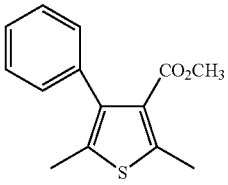 | 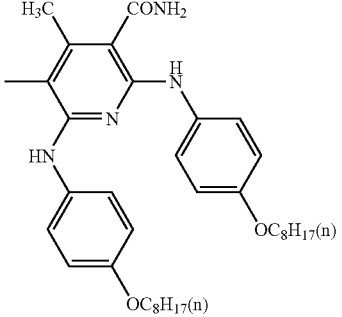 |

TABLE 3-continued
A—N=N—B—N=N—C
| A | B | C |
|---|---|---|
| (c-3)  | | |
| (c-4) | | |
| (c-5) | | |
TABLE 4
A—N=N—B—N=N—C
| A | B | C |
|---|---|---|
| (d-1) 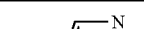 | | |

TABLE 4-continued
| | A—N=N—B—N=N—C | |
|---|---|---|
| A | B | C |
(d-2) 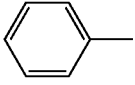 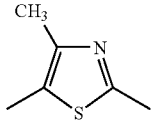 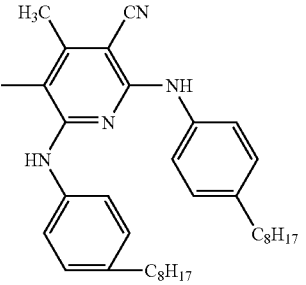
(d-3) 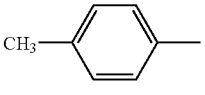 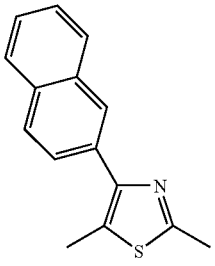 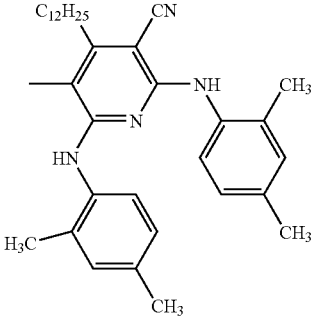
(d-4) 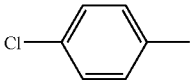 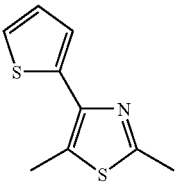 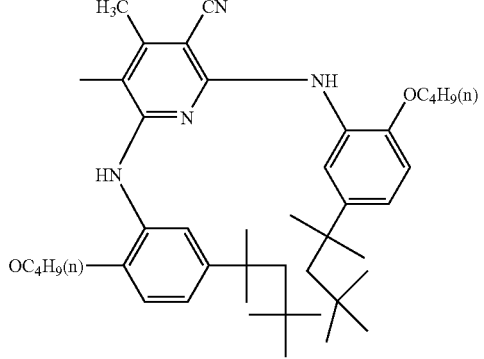
(d-5) 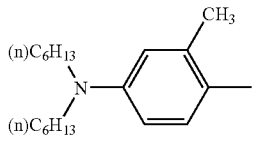 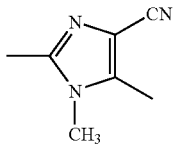 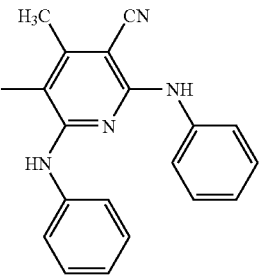

TABLE 4-continued

| | A | B | C |
|---|---|---|---|
| (d-6) | CH₃SO₂-C₆H₄- | 2,5-dimethyl-1-ethyl-imidazole-4-CN | 3-CN-4-methyl-5-methyl-2,6-bis[(4-n-octylphenyl)amino]pyridine |

TABLE 5

| | A | B | C |
|---|---|---|---|
| (e-1) | CH₃-C₆H₄- | 2,6-dimethylbenzothiazole | 3-CN-4-methyl-5-methyl-2,6-bis[(4-n-octylphenyl)amino]pyridine |
| (e-2) | CH₃O-C₆H₄- | 2,5-dimethylthieno[3,2-d]thiazole | 3-CN-4-methyl-5-methyl-2,6-bis[(4-n-octylphenyl)amino]pyridine |

TABLE 6

| | A | B | C |
|---|---|---|---|
| (f-1) | Cl-C₆H₄- | 2,5-dimethyl-3-(2-naphthyl)-4-CN-thiophene | 5-amino-4-methyl-3-tert-butyl-1-dodecylpyrazole |

TABLE 6-continued

| | A—N=N—B—N=N—C | |
|---|---|---|
| A | B | C |

(f-2) — A: 3,5-bis(octyloxycarbonyl)toluene (H₁₇C₈O₂C substituents); B: 2,5-dimethyl-3-cyanothiophene; C: 5-amino-3,4-dimethyl-1-phenylpyrazole (f-3) — A: toluene; B: 2,5-dimethyl-3-cyanothiophene; C: 5-amino-4-methyl-3-phenyl-1-[4,6-bis(3,5-bis(butoxycarbonyl)phenylamino)-1,3,5-triazin-2-yl]pyrazole (f-4) — A: N,N-di(n-butyl)-3-butoxy-4-methylaniline; B: 2,5-dimethyl-4-methylthiazole; C: 5-amino-3-tert-butyl-4-methyl-1-ethylpyrazole (g-1) — structure: 4-(methylsulfonyl)-2-cyanophenyl—N=N—(2,5-dimethylphenyl)—N=N—[4-methyl-3-cyano-2,6-bis(4-n-octylphenylamino)pyridin-5-yl]

| | A | B | C |
|---|---|---|---|
| | | A—N=N—B—N=N—C | |
| (g-2) | 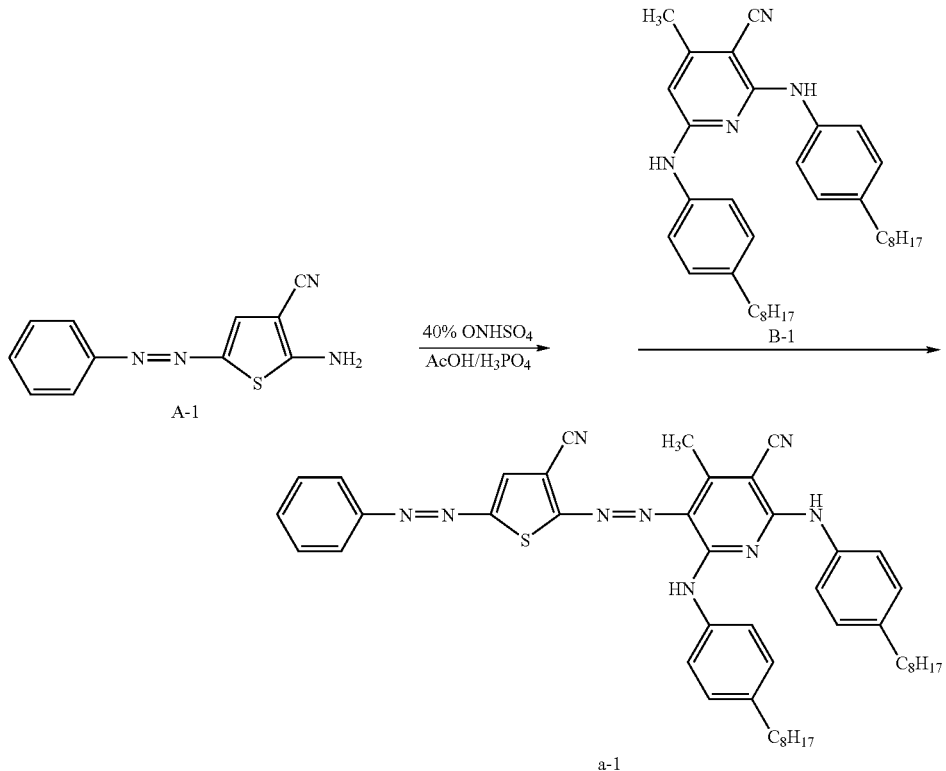 | | |

(Table 6-continued)

The dyes represented by formulae (1), (2), (3), (4) and (6) can be synthesized by a coupling reaction of a diazo component and a coupler. Synthesis examples of the dyes represented by formulae (1), (2), (3), (4) and (6) are described below.

of DMF, and reacted at 0 to 5° C. for 1 hour. The reaction solution was filtered, washed with water and purified by silica gel column to obtain 4.89 g (yield: 73%) of objective a-1. M/S=765, λmax=611.0 nm (chloroform).

The synthesis route is shown below.

[Synthesis Example of Dye a-1]

Diazo Component A-1 (2.00 g) was suspended in 20 mol of acetic acid and 20 mol of 85% phosphoric acid. While keeping the liquid temperature at −2° C. to 0° C., 2.8 g of concentrated sulfuric acid and 0.6 g of 40% nitrosyl-sulfuric acid were added thereto. The resulting solution was added with stirring to a solution obtained by dissolving 4.59 g of Coupler Component B-1 in 40 ml of acetic acid and 30 ml

[Synthesis Example Dye d-2]

Diazo Component D-2 (1.30 g) and 3.0 g of Coupler Component B-1 were suspended in 20 mol of formic acid. While keeping the liquid temperature at 7 to 10° C., 0.40 g of sodium nitrite was added thereto and reacted at 7 to 10° C. for 1 hour. The reaction solution was released in ice water and the resulting slurry was filtered, washed with water and purified by silica gel column to obtain 1.23 g (yield: 28%) of objective d-1. M/S=739, λmax=579.8 nm (chloroform).

The synthesis route is shown below.

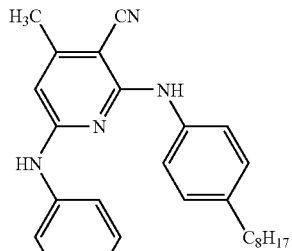

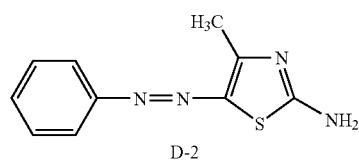

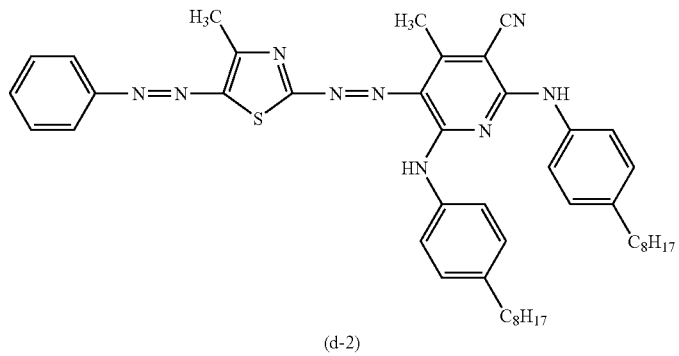

(d-2)

The dye of the present invention is mainly used in the inkjet ink composition and color toner composition of the present invention, which are described below, and these compositions are used in an image recording material for forming an image, particularly a color image. Specific examples of the image recording material include an ink-jet recording material which is described later in detail, a pressure-sensitive recording material, an electro-photographic recording material, a transfer silver halide light-sensitive material, a printing ink and a recording ink. Among these, preferred are an inkjet recording material and an electrophotographic recording material, more preferred is an inkjet recording material.

The dye for use in the present invention can be adjusted by the substituent to have physical properties suitable for use, such as solubility, dispersibility and thermal transferability. Furthermore, the dye for use in the present invention can be used in a dissolved state, an emulsion-dispersed state or a solid-dispersed state according to the system in which the dye is used.

<Inkjet Ink Composition>

The inkjet ink composition of the present invention contains the dye represented by formula (1). The ink-jet ink composition of the present invention for use in the inkjet ink can be produced by dissolving and/or dispersing the dye of the present invention in a lipophilic or aqueous medium. An aqueous medium is preferred and an aqueous ink composition is preferably obtained. If desired, other additives may be added within the range of not impairing the effect of the present invention. Examples of other additives include known additives such as drying inhibitor (wetting agent), discoloration inhibitor, emulsification stabilizer, permeation accelerator, ultraviolet absorbent, antiseptic, fungicide, pH adjusting agent, surface tension adjusting agent, defoaming agent, viscosity adjusting agent, dispersant, dispersion stabilizer, rust inhibitor and chelating agent. When an oil-soluble dye is used in the form of a dispersion, these various additives are generally added to the dispersion after the preparation of a dye dispersion but may be added to the oil or aqueous phase at the preparation.

The drying inhibitor is suitably used for the purpose of preventing occurrence of clogging due to drying of the inkjet ink composition of the present invention at the ink jetting port of a nozzle used for the inkjet recording system.

The drying inhibitor is preferably a water-soluble organic solvent having a vapor pressure lower than water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl)ether, diethylene glycol monomethyl(or ethyl)ether and triethylene glycol monoethyl(or butyl)ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in the ink in an amount of 10 to 50 mass %.

The permeation accelerator is suitably used for the purpose of obtaining higher permeation of the inkjet ink into paper. Examples of the permeation accelerator which can be used include alcohols (e.g., ethanol, isopropanol, butanol, di(tri)ethylene glycol monobutyl ether, 1,2-hexanediol), sodium laurylsulfate, sodium oleate and nonionic surfactants. A sufficiently high effect can be obtained by adding from 5 to 30 mass % of the permeation accelerator to the ink. The permeation accelerator is preferably used in an amount within the range of causing no blurring of printed letter or no print through.

The ultraviolet absorbent is used for the purpose of improving the preservability of image. Examples of the ultraviolet absorbent which can be used include benzotriazole-base compounds described, for example, in JP-A-58-185677, JP-A-61-190537, JP-A-2-782, JP-A-5-197075 and JP-A-9-34057, benzophenone-base compounds described, for example, in JP-A-46-2784, JP-A-5-194483 and U.S. Pat. No. 3,214,463, cinnamic acid-base compounds described, for example, in JP-B-48-30492 (the term "JP-B" as used herein means an "examined Japanese patent publication"), JP-B-56-21641 and JP-A-10-88106, triazine-base compounds described, for example, in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in *Research Disclosure* No. 24239, and compounds of absorbing ultraviolet light and emitting fluorescent light, so-called fluorescent brightening agents, represented by stilbene-base compound and benzoxazole-base compound.

The discoloration inhibitor is used for the purpose of improving the preservability of image. Examples of the discoloration inhibitor which can be used include various organic discoloration inhibitors and metal complex-base discoloration inhibitors. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide include sodium dehydroacetate, sodium benzoate, sodium pyridinethione-1-oxide, ethyl p-hydroxybenzoate, 1,2-benzisothiazolin-3-one and salts thereof. The fungicide is preferably used in the inkjet ink composition in an amount of 0.02 to 1.00 mass %.

As the pH adjusting agent, the above-described neutralizer (e.g., organic base, inorganic alkali) can be used. The pH adjusting agent is used for the purpose of improving the storage stability of the inkjet ink composition and is preferably added to adjust the ink-jet ink composition to a pH of 6 to 10, more preferably to a pH of 7 to 10.

The surface tension adjusting agent includes nonionic, cationic and anionic surfactants. Here, the surface tension of the inkjet ink composition of the present invention is preferably from 20 to 60 mN/m, more preferably from 25 to 45 mN/m. Also, the viscosity of the inkjet ink composition of the present invention is preferably adjusted to 30 mPa·s or less, more preferably 20 mPa·s or less.

Preferred examples of the surfactant include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylenealkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. In addition, amine oxide-type amphoteric surfactants such as N,N-dimethyl-N-alkylamine oxide are preferred. Furthermore, surfactants described in JP-A-59-157636 (pages (37) to (38)) and *Research Disclosure*, No. 308119 (1989) can be used.

As the defoaming agent, for example, a chelating agent represented by fluorine- or silicon-containing compounds and EDTA can also be used, if desired.

In the case of dispersing the dye of the present invention in an aqueous medium, a colored fine particle containing the dye and an oil-soluble polymer is preferably dispersed in an aqueous medium as described in JP-A-11-286637 and Japanese Patent Application Nos. 2000-78491, 2000-80259 and 2000-62370, or the dye of the present invention dissolved in a high boiling point organic solvent is preferably dispersed in an aqueous medium as described in Japanese Patent Application Nos. 2000-78454, 2000-78491, 2000-203856 and 2000-203857. With respect to the specific method for dispersing the dye of the present invention in an aqueous medium, the oil-soluble polymer, high boiling point organic solvent and additives used, and the amounts thereof, those described in these patent publications can be preferably used. Also, the azo dye which is solid can be dispersed as it is in a fine particle state. At the dispersion, a dispersant or a surfactant can be used. As for the dispersing device, a simple stirrer, an impeller stirring system, an in-line stirring system, a mill system (e.g., colloid mill, ball mill, sand mill, attritor, roll mill, agitator mill), an ultrasonic wave system and a high-pressure emulsion-dispersion system (high-pressure homogenizer; specific examples of the commercially available device include Gaulin Homogenizer, Microfluidizer and DeBEE 2000) can be used. The preparation method of the inkjet ink is described in detail in JP-A-5-148436, JP-A-5-295312, JP-A-7-97541, JP-A-7-82515, JP-A-7-118584, JP-A-11-286637 and Japanese Patent Application No. 2000-87539 in addition to the above-described patent publications and the contents described in these patent publications can be used also for the preparation of the inkjet ink using the ink-jet ink composition of the present invention.

As the aqueous medium, a mixture comprising water as the main component, where a water-miscible organic solvent is added, if desired, can be used. Examples of the water-miscible organic solvent include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

The dye for use in the present invention is preferably contained in an amount of 0.2 to 30 parts by mass per 100 parts by mass of the inkjet ink composition of the present invention. In the inkjet ink composition of the present invention, the black dye of the present invention or other black dye may be used in combination with the dye for use in the present invention. In the case of using two or more dyes in combination, the total content of the dyes is preferably in the above-described range. Furthermore, a dye of other color may also be used in combination so as to adjust the black color tone.

The inkjet ink composition of the present invention can be used not only for the formation of a monochromatic image but also for the formation of a full color image. For forming a full color image, a magenta color tone ink, a cyan color tone ink and a yellow color tone ink can be used. As the yellow dye, an arbitrary yellow dye may be mixed and used. Examples thereof include aryl- or heteryl-azo dyes having a phenol, a naphthol, an aniline, a heterocyclic ring (e.g., pyrazolone, pyridone), an open chain-type active methylene compound or the like as the coupling component (hereinafter referred to as a "coupler component"); azomethine dyes having an open chain-type active methylene compound or the like as the coupler component; methine dyes such as benzylidene dye and monomethine oxonol dye; and quinone-base dyes such as naphthoquinone dye and anthraquinone dye. Other examples of the dye species include quinophthalone dye, nitro-nitroso dye, acridine dye and acridinone dye.

As the magenta dye which can be used in the present invention, an arbitrary magenta dye may be used. Examples thereof include aryl- or heteryl-azo dyes having a phenol, a naphthol or an aniline as the coupler component; azomethine dyes having a pyrazolone or a pyrazolotriazole as the coupler component; methine dyes such as arylidene dye, styryl dye, merocyanine dye, cyanine dye and oxonol dye; carbonium dyes such as diphenylmethane dye, triphenylmethane dye and xanthene dye; quinone dyes such as naphthoquinone, anthraquinone and anthrapyridone; and condensed polycyclic dyes such as dioxazine dye.

As the cyan dye which can be used in the present invention, an arbitrary cyan dye can be used. Examples thereof include aryl- or heteryl-azo dyes having a phenol, a naphthol or an aniline as the coupler component; azomethine dyes having a phenol, a naphthol or a heterocyclic ring (e.g., pyrrolotriazole) as the coupler component; polymethine dyes such as cyanine dye, oxonol dye and merocyanine dye; carbonium dyes such as diphenylmethane dye, triphenylmethane dye and xanthene dye; phthalocyanine dyes; anthraquinone dyes; and indigo-thioindigo dyes.

These dyes may be a dye which provides a yellow, magenta or cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation as a partial structure.

Furthermore, in the present invention, a dispersion of carbon black, particularly self-dispersible carbon black, may also be used.

<Inkjet Recording Method>

In the inkjet recording method of the present invention, an energy is provided to the inkjet ink comprising the inkjet ink composition of the present invention and thereby an image is formed on a known image-receiving material, namely, plain paper, resin coated paper, inkjet special paper described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic common paper, cloth, glass, metal, ceramic or the like.

At the formation of an image, a polymer latex compound may be used in combination for the purpose of giving glossiness or water resistance or improving the weather resistance. The timing of imparting the latex compound to the image-receiving material may be before, after or simultaneous with the addition of the coloring agent. Accordingly, the site to which the polymer latex is added may be in the image-receiving paper or ink or a liquid material composed of the polymer latex alone may be prepared and used. More specifically, the methods described in Japanese Patent Application Nos. 2000-363090, 2000-315231, 2000-354380, 2000-343944, 2000-268952, 2000-299465 and 2000-297365 can be preferably used.

The recording paper and recording film which are used in the inkjet printing performed using an inkjet ink comprising the inkjet ink composition of the present invention are described below. The support which can be used for the recording paper or film is produced, for example, from a chemical pulp such as LBKP and NBKP, a mechanical pulp such as GP, PGW, RMP, TMP, CTMP, CMP and CGP, a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film may be used. The thickness of the support is preferably from 10 to 250 μm and the basis weight is preferably from 10 to 250 g/m². An ink-accepting layer and a backcoat layer may be provided on the support as it is, or a size press or anchor coat layer is provided using starch, polyvinyl alcohol or the like and then an ink-accepting layer and a backcoat layer may be provided. The support may be further subjected to a flattening treatment by a calendering device such as machine calender, TG calender and soft calender. The support for use in the present invention is preferably paper or plastic film of which both surfaces are laminated with polyolefin (for example, polyethylene, polystyrene, polyethylene terephthalate, polybutene or a copolymer thereof). In the polyolefin, a white pigment (for example, titanium oxide or zinc oxide) or a tinting dye (for example, cobalt blue, ultramarine or neodymium oxide) is preferably added.

The ink-accepting layer provided on the support contains a pigment and an aqueous binder. The pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. The white pigment contained in the ink-accepting layer is preferably a porous inorganic pigment, more preferably an inorganic white pigment fine particle having a large pore area, such as synthetic amorphous silica. The synthetic amorphous silica may be either a silicic acid anhydride obtained by a dry production method or a silicic acid hydrate obtained by a wet production method but is preferably a silicic acid hydrate.

Examples of the aqueous binder contained in the ink-accepting layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers such as styrene-butadiene copolymer latex and acryl emulsion. These aqueous binders can be used individually or in combination of two or more thereof. Among these, polyvinyl alcohol and silanol-modified polyvinyl alcohol are preferred in the present invention in view of attaching property to the pigment and peeling resistance of the ink-accepting layer.

The ink-accepting layer may contain a mordant, a water-proofing agent, a light fastness enhancer, a surfactant and other additives in addition to the pigment and the aqueous binder.

The mordant added to the ink-accepting layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, light fastness of the image is improved.

The water-proofing agent is effective for forming a water-resistant image. The water-proofing agent is preferably a cationic resin. Examples of the cationic resin include polyamidopolyamine epichlorohydrin, polyethyleneimine, polyaminesulfone, poly-dimethyldiallylammonium chloride, cation polyacrylamide and colloidal silica. Among these cationic resins, polyamidopolyamine epichlorohydrin is preferred. The cationic resin content is preferably from 1 to 15 mass %, more preferably from 3 to 10 mass %, based on the entire solid content of the ink-accepting layer.

Examples of the light fastness enhancer include zinc sulfate, zinc oxide, hindered amine-base antioxidants and benzophenone-base or benzotriazole-base ultraviolet absorbents. Among these, zinc sulfate is preferred.

The surfactant functions as a coating aid, a releasability improver, a slipperiness improver or an antistatic agent. The surfactant is described in JP-A-62-173463 and JP-A-62-183457. In place of the surfactant, an organic fluoro compound may be used. The organic fluoro compound is preferably hydrophobic. Examples of the organic fluoro compound include a fluorine-containing surfactant, an oily fluorine-base compound (for example, fluorine oil) and a solid fluorine compound resin (for example, ethylene tetrafluoride resin). The organic fluoro compound is described in JP-B-57-9053 (columns 8 to 17), JP-A-61-20994 and JP-A-62-135826. Other examples of the additive added to the ink-accepting layer include a pigment dispersant, a thickener, a defoaming agent, a dye, a fluorescent brightening agent, an antiseptic, a pH adjusting agent, a matting agent and a hardening agent. The ink-accepting layer may be composed of either one layer or two layers.

In the recording paper or film, a backcoat layer may also be provided. Examples of the component which can be added to this layer include a white pigment, an aqueous binder and other components. Examples of the white pigment contained in the backcoat layer include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other examples of the component contained in the backcoat layer include a defoaming agent, a foam inhibitor, a dye, a fluorescent brightening agent, an antiseptic and a water-proofing agent.

A polymer latex may be added to a constituent layer (including the backcoat layer) of the inkjet recording paper or film. The polymer latex is used for the purpose of improving film properties, for example, stabilizing the dimension and preventing the curling, adhesion or film cracking. The polymer latex is described in JP-A-62-245258, JP-A-62-1316648 and JP-A-62-110066. When a polymer latex having a low glass transition temperature (40° C. or less) is added to a layer containing a mordant, the layer can be prevented from cracking or curling. The curling can also be prevented by adding a polymer latex having a high glass transition temperature to the backcoat layer.

The inkjet ink comprising the inkjet ink composition of the present invention is not limited in the ink-jet recording system and is used for a known system, for example, a charge controlling system of jetting out the ink by using the electrostatic induction force, a drop-on-demand system (pressure pulse system) of using a vibration pressure of a piezoelectric element, an acoustic ink-jet system of converting electric signals into acoustic beams, irradiating the beams on the ink and jetting out the ink by using the radiation pressure, and a thermal inkjet system of heating the ink to form a bubble and utilizing the generated pressure. The inkjet recording system includes a system of ejecting a large number of small-volume ink droplets of so-called photo-ink having a low concentration, a system of improving the image quality by using a plurality of inks having substantially the same color hue but differing in the concentration, and a system of using a colorless transparent ink.

<Color Toner>

The color toner composition of the present invention is characterized by containing at least one azo dye represented by any one of formulae (1), (2), (3), (4) and (6). If desired, the color toner composition of the present invention contains, in addition to the dye for use in the present invention, a binder resin for color toner, a releasing agent, a charge controlling agent and a carrier. The dye for use in the present invention is preferably contained in an amount of 0.1 parts by mass or more, more preferably 1.0 part by mass or more, per 100 parts by mass of the color toner composition of the present invention.

As the binder resin for color toner, where the dye for use in the present invention is introduced, commonly employed binders all can be used. Examples thereof include styrene-base resin, acryl-base resin, styrene-acryl-base resin and polyester resin.

Also, an inorganic or organic fine particle may be externally added to the toner for the purpose of, for example, improving the flowability or controlling the electric charge. A silica or titania fine particle surface-treated with an alkyl group-containing coupling agent or the like is preferably used. Such a fine particle preferably has a number average primary particle size of 10 to 500 nm and is preferably added in an amount of 0.1 to 20 mass % to the toner.

As the releasing agent, conventionally employed releasing agents all can be used. Specific examples thereof include polyolefins such as low molecular weight propylene, low molecular weight polyethylene and ethylene-propylene copolymer, microcrystalline wax, carnauba wax, sazole wax and paraffin wax. The releasing agent is preferably added in an amount of 1 to 5 mass % to the toner.

The charge controlling agent may be added, if desired, but in view of color formation, a colorless charge controlling agent is preferred. Examples thereof include those having a quaternary ammonium salt structure and those having a calix arene structure.

The carrier may be either a non-coated carrier composed of only a magnetic material particle such as iron and ferrite, or a resin-coated carrier obtained by coating the surface of a magnetic material particle with resin or the like. The average particle size of this carrier is preferably from 30 to 150 μm in terms of the volume average particle size.

The image forming method to which the color toner composition of the present invention is applied is not particularly limited, but examples thereof include a method of repeatedly forming a color image on a photoreceptor and then transferring the resulting image, thereby forming an image, and a method of sequentially transferring the image formed on a photoreceptor to an intermediate transferee or the like to form a color image on the intermediate transferee or the like and then transferring the image on an image-forming member such as paper.

EXAMPLES

The present invention is described in greater detail below by referring to Examples, however, the present invention is not limited to these Examples.

Example 1 Example of Dispersion-Type Ink (Production of Sample 101)

Azo Dye a-1 (3.75 g) and 7.04 g of sodium dioctyl-sulfosuccinate were dissolved at 70° C. in 4.22 g of High Boiling Point Organic Solvent (S-2) shown below, 5.63 g of High Boiling Point Organic Solvent (S-11) shown below and 50 ml of ethyl acetate. In this solution, 500 ml of deionized water was added while stirring with a magnetic stirrer to produce an oil-in-water coarse particle dispersion. The obtained coarse particle dispersion was pulverized by passing it five times through Microfluidizer (manufactured by MICROFLUIDEX INC.) under a pressure of 600 bar. The resulting emulsified product was subjected to removal of solvent in a rotary evaporator until the odor of ethyl acetate was not generated. To the thus-obtained hydrophobic dye fine emulsion, 140 g of diethylene glycol, 50 g of glycerin, 7 g of SURFYNOL 465 (produced by Air Products & Chemicals) and 900 ml of deionized water were added to produce an ink.

S-2:

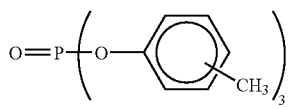

S-11:

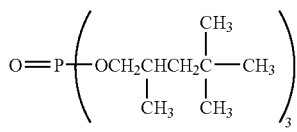

(Production of Samples 102 to 107)

Samples 102 to 107 were produced in the same manner as Sample 101 except for changing Dye a-1 of Sample 101 to the dye shown in Table 7.

(Production of Comparative Samples 108 to 110)

Deionized water was added to the following components to make 1 liter and the resulting solution was stirred for 1 hour under heating at 30 to 40° C. Thereafter, the solution was adjusted to a pH of 9 with 10 mol/L of KOH and then filtered under reduced pressure through a microfilter having an average pore size of 0.25 μm to prepare Comparative Samples 108 to 110 as the ink for comparison.

Composition of Comparative Ink Solution 108 to 110:

| | |
|---|---|
| Comparative dye shown in Table 7 | 25 g |
| Diethylene glycol | 20 g |
| Glycerin | 120 g |
| Diethylene glycol monobutyl ether | 230 g |
| 2-Pyrrolidone | 80 g |
| Triethanolamine | 17.9 g |
| Benzotriazole | 0.06 g |
| SURFYNOL TG | 8.5 g |
| PROXEL XL2 | 1.8 g |

The structure of each comparative dye used is shown below.

Comparative Dye A (oil-soluble) (Compound of German Patent 2743097):

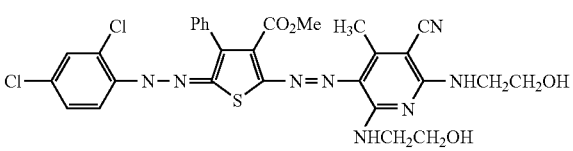

Comparative Dye B (oil-soluble) (Compound of JP-A-59-133259):

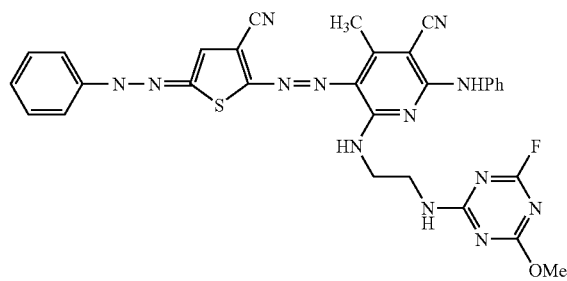

Comparative Dye C (water-soluble)(Compound of EP No. 0761771):

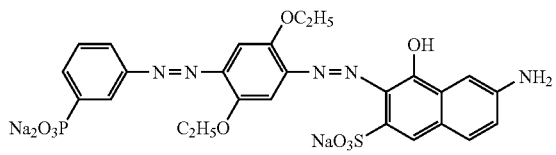

(Recording and Evaluation of Image)

Ink Samples 101 to 107 and Comparative Samples 108 to 110 each was subjected to the following evaluations. The results obtained are shown in Table 7.

In Table 7, each evaluation was performed after an image was recorded using each inkjet ink on a photo gloss paper (Inkjet Paper Photo Grade, produced by Fuji Photo Film Co., Ltd.) in an inkjet printer (PM-700C, manufactured by Seiko Epson Corp.).

<Printing Performance>

Cartridges were set in the printer and after confirming the ejection of ink through all nozzles, an image was output on 20 sheets of A4-size paper. The printing disorder was evaluated based on the following criteria:

A: Printing was not disordered from the start to the end of printing.

B: Printing was disordered in some outputs.

C: Printing was disordered from the start to the end of printing.

<Blurring of Fine Line>

In the evaluation of fine line blurring, a fine line pattern was printed and left standing for 2 days under the conditions of 35° C. and 80% RH and then the blurring was evaluated with an eye. The rating was ○ when blurring was not observed, and X when blurring was observed.

<Paper Dependency>

The image formed on the above-described photo gloss paper and the image separately formed on plain paper for PPC were compared on the color tone. The evaluation was performed by the two-stage rating, that is, A (good) when the difference between two images was small, and B (bad) when the difference between two images was large.

<Water Resistance>

The photo gloss paper having formed thereon an image was dried at room temperature for 1 hour, dipped in water for 30 seconds and then naturally dried at room temperature. The bleeding was observed and evaluated by the three-stage rating, that is, A when bleeding was not observed, B when bleeding was slightly generated and C when bleeding was seriously generated.

<Light Fastness>

On the photo gloss paper having formed thereon an image, xenon light (85,000 lx) was irradiated for 10 days using a weather meter (Atlas C. I65). The image density before and after the xenon irradiation was measured by a reflection densitometer (X-Rite 310TR) and evaluated as the dye residual percentage. The reflection density was measured at three points of 1, 1.5 and 2.0.

The light fastness was evaluated by the four-stage rating, that is, A when the dye residual percentage was 90% or more at all densities, B when less than 90% at one point, C when less than 90% at two points, and D when less than 90% at all densities.

<Ozone Resistance>

In a box set to an ozone gas concentration of 0.5 ppm, the photo gloss paper having formed thereon an image was left standing for 1 week. The image density before and after standing in the ozone gas atmosphere was measured by a reflection densitometer (X-Rite 310TR) and evaluated as the dye residual percentage. The reflection density was measured at three points of 1, 1.5 and 2.0. The ozone gas concentration in the box was set by using an ozone gas monitor (Model OZG-EM-01) manufactured by APPLICS.

The evaluation was performed by a four-stage rating, namely, A when the dye residual percentage was 90% or more at all densities, B when less than 90% at one point, C when less than 90% at two points, and D when less than 90% at all densities.

TABLE 7

| Sample | No. of Dye | Printing Performance | Blurring of Fine Line | Paper Dependency | Water Resistance | Light Fastness | Ozone Resistance | |
|---|---|---|---|---|---|---|---|---|
| 101 | a-1 | A | ○ | A | A | A | A | Invention |
| 102 | a-3 | A | ○ | A | A | A | A | Invention |
| 103 | a-6 | A | ○ | A | A | A | A | Invention |
| 104 | b-1 | A | ○ | A | A | A | A | Invention |
| 105 | b-7 | A | ○ | A | A | A | A | Invention |
| 106 | c-3 | A | ○ | A | A | A | A | Invention |
| 107 | d-2 | A | ○ | A | A | A | A | Invention |
| 108 | Comparative Dye A | C | ○ | A | A | B | B | Comparison |
| 109 | Comparative Dye B | C | ○ | A | A | B | B | Comparison |
| 110 | Comparative Dye C | A | X | B | C | D | D | Comparison |

As apparently seen from Table 7, the inkjet ink comprising the inkjet ink composition of the present invention was high in the dispersion stability (solubility) (excellent in printing performance and fine line blurring), small in the paper dependency and excellent in the water resistance, light fastness and ozone resistance.

Example 2 Example of Dispersion-Type Ink

The same ink as produced in Example 1 was filled in a cartridge of Inkjet Printer BJ-F850 (manufactured by Canon Inc.) and using this printer, an image was printed on Photo Gloss Paper GP-301 produced by the same company and evaluated in the same manner as in Example 1. Then, the same results as in Example 1 were obtained.

Example 3 Example of Toner Composition

Azo Dye a-1 (3 parts by mass) of the present invention and 100 parts by mass of a toner resin [styrene-acrylic acid ester copolymer; Himer TB-1000F, trade name (produced by Sanyo Chemical Industries Co., Ltd.)] were mixed and ground in a ball mill and then melt-mixed under heating at 150° C. The melt was cooled, then coarsely ground by using a hammer mill and further finely ground by an air jet system pulverizer. The obtained powder particles were classified and the powder of 1 to 20 μm was selected and used as the toner. Subsequently, 10 parts by mass of this toner and 900 parts by mass of carrier iron powder (EFV250/400, trade name, produced by Nippon Iron Powder) were uniformly mixed to prepare a developing powder. Other samples were prepared in the same manner except for using 3 parts by mass of the dye shown in Table 8. Using these developing powders, copying was performed by a dry plain paper electrophotographic copying machine (NP-500, trade name, manufactured by Canon Inc.).

In the evaluation test, a reflection image (image on paper) and a transmission image (OHP image) were formed on paper and OHP, respectively, with the developing powder using the color toner composition of the present invention by the above-described image forming method and evaluated as follows. The evaluation was performed in the range of toner attached amount of 0.7±0.05 (mg/cm$^2$).

The obtained images were evaluated on the color hue and light fastness.

The color hue was evaluated with an eye by the three-state rating of best, good and bad. The evaluation results are shown in Table 8. In Table 8, ○ reveals that the color hue was best, Δ reveals that the color hue was good, and X reveals that the color hue was bad.

In the evaluation of light fastness, the image density Ci immediately after recording was measured, xenon light (85,000 lx) was irradiated on the image for 10 days by using a weather meter (Atlas C.165), and the image density Cf was again measured. The dye residual percentage ({(Ci−Cf)/Ci}×100%) was determined from the difference of image density between before and after the irradiation of xenon light and rated. The image density was measured using a reflection densitometer (X-Rite 310TR). The evaluation results are shown in Table 8 below. In Table 8, the rating was ○ when the dye residual percentage was 90% or more, Δ when from 80 to 90%, and X when less than 80%.

The transparency of OHP image was evaluated by the following method. The visible spectral transmittance of the image was measured by means of "Model 330 Auto-Spectrophotometer" manufactured by Hitachi, Ltd. using an OHP sheet having not carried thereon a toner as the reference. The spectral transmittance at 650 nm was determined and used as an index for showing the transparency of OHP image. The rating was ○ when the spectral transmittance was 80% or more, Δ when from 70 to 80%, and X when less than 70%. The results are shown in Table 8.

TABLE 8

|  | No. of Dye | Color Hue | Light Fastness | Transparency |
| --- | --- | --- | --- | --- |
| Invention | a-1 | ○ | ○ | ○ |
| Invention | a-4 | ○ | ○ | ○ |
| Invention | b-1 | ○ | ○ | ○ |
| Invention | c-3 | ○ | ○ | ○ |
| Comparative Example | Comparative Dye A | X | Δ | Δ |
| Comparative Example | Comparative Dye B | Δ | ○ | X |

As apparently seen from Table 8, when the color toner composition of the present invention is used, faithful color reproduction and high OHP quality are exhibited. Thus, the color toner composition of the present invention is suitable for use as a full color toner. In addition, good light fastness is exhibited. Therefore, an image capable of being stored over a long period of time can be provided.

The coloring composition of the present invention uses an azo dye excellent in solubility and fastness, so that a colored image or material excellent in color hue and fatness can be obtained. For example, a colored image excellent in color hue and fastness can be obtained from an inkjet ink or an electrophotographic color toner composition.

Furthermore, by using this inkjet ink, an ink-jet recording method capable of forming an image having good color hue and high fastness to light and active gases in the environment, particularly ozone gas, is provided.

This application is based on Japanese patent application JP 2003-002330, filed on Jan. 8, 2003, the entire content of which is hereby incorporated by reference, the same as if set forth at length.

What is claimed is:

1. An inkjet ink comprising at least one azo dye represented by the following formula (1), containing at least one alkyl chain having 4 or more carbon atoms and not containing an ionic hydrophilic group:

A—N=N—B—N=N—C         Formula (1):

wherein A and C each independently represents an aromatic group which may be substituted or a heterocyclic group which may be substituted, provided that A and C each is a monovalent group and B is a divalent group, wherein B is directly bonded to the nitrogen atoms adjacent to B, wherein B consists of an aromatic group which may be substituted or a heterocyclic group which may be substituted, and wherein at least two of A, B and C represent a heterocyclic group which may be substituted.

2. The inkjet ink according to claim 1, wherein the at least one azo dye is an azo dye represented by the following formula (2), containing at least one alkyl chain having 4 or more carbon atoms and not containing an ionic hydrophilic group:

A—N=N—B—N=N-Het         Formula (2)

wherein A and B are the same as A and B in the formula (1), respectively, and Het represents an aromatic heterocyclic group.

3. The inkjet ink according to claim 2, wherein at least one of A and B in the formula (2) is an aromatic heterocyclic group.

4. The inkjet ink according to claim 2, wherein Het in the formula (2) is an aromatic nitrogen-containing six-membered heterocyclic group.

5. The inkjet ink according to claim 1, wherein the at least one azo dye is an azo dye represented by the following formula (3), containing at least one alkyl chain having 4 or more carbon atoms and not containing an ionic hydrophilic group:

Formula (3):

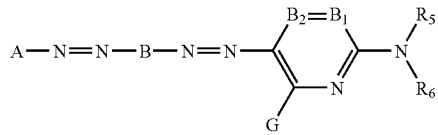

wherein A and B are the same as A and B in the formula (1), respectively, $B_1$ and $B_2$ each represents $=CR_1-$ or $-CR_2=$ or either one of $B_1$ and $B_2$ represents a nitrogen atom and the other represents $=CH_1-$ or $-CR_2=$, G, R1 and R2 each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfonyl group or a sulfamoyl group, and each group may be further substituted, $R_5$ and $R_6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent, provided that $R_5$ and $R_6$ are not a hydrogen atom at the same time, and $R_1$ and $R_5$, or $R_5$ and $R_6$ may combine to form a 5- or 6-membered ring.

6. The inkjet ink according to claim 5, wherein the at least one azo dye is an azo dye represented by the following formula (4), containing at least one alkyl chain having 4 or more carbon atoms and not containing an ionic hydrophilic group:

Formula (4):

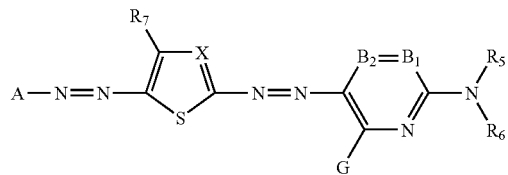

wherein X represents a nitrogen atom or $-C(R_8)=$; $R_7$ and $R_8$ each has the same meaning as $R_1$ in formula (3); A, $R_5$, $R_6$, $B_1$, $B_2$ and G are the same as A, $R_5$, $R_6$, $B_1$, $B_2$ and G in the formula (3), respectively.

7. The inkjet ink according to claim 6, wherein the at least one azo dye is an azo dye represented by the following formula (6), containing at least one alkyl chain having 4 or more carbon atoms and not containing an ionic hydrophilic group:

Formula (6):

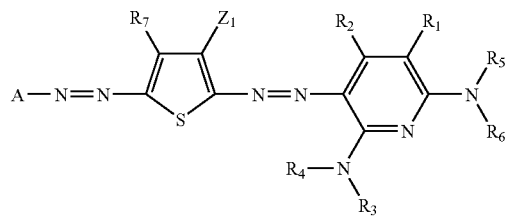

wherein $Z_1$ represents an electron-withdrawing group having a Hammett's substituent constant σp value of 0.20 or more; $R_1$, $R_2$, $R_5$ and $R_6$ have the same meanings as in the formula (3), respectively; $R_3$ and $R_4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group; A and $R_7$ have the same meanings as in the formula (4), respectively.

8. The inkjet ink according to claim 1, wherein the total carbon atom number of all alkyl chains having 4 or more carbon atoms in the at least one azo dye is 12 or more.

9. An inkjet recording method comprising forming an image on an image-receiving material by using the inkjet ink claimed in claim 1, in which said image-receiving material comprises a support and an ink-accepting layer containing an inorganic white pigment particle.

10. A color toner composition comprising at least one azo dye described in claim 1.

11. The inkjet ink according to claim 5, wherein the amino group comprises an arylamino group or a heterocyclic amino group.

* * * * *